(12) United States Patent
Hediger

(10) Patent No.: US 11,065,731 B2
(45) Date of Patent: Jul. 20, 2021

(54) CLAMPING DEVICE

(71) Applicant: Erowa AG, Reinach (CH)

(72) Inventor: Hans Hediger, Reinach (CH)

(73) Assignee: EROWA AG, Reinach (CH)

( * ) Notice: Subject to any disclaimer, the term of this patent is extended or adjusted under 35 U.S.C. 154(b) by 389 days.

(21) Appl. No.: 15/486,662

(22) Filed: Apr. 13, 2017

(65) Prior Publication Data
US 2018/0001427 A1    Jan. 4, 2018

(30) Foreign Application Priority Data
Jun. 30, 2016    (CH) .................................. 00829/16

(51) Int. Cl.
     *B23Q 3/10*      (2006.01)
     *B23B 31/107*      (2006.01)
     *B23Q 1/00*      (2006.01)

(52) U.S. Cl.
     CPC ............ *B23Q 3/102* (2013.01); *B23B 31/107* (2013.01); *B23Q 1/0072* (2013.01); *B23Q 3/103* (2013.01); *B23B 2260/068* (2013.01); *B23B 2270/027* (2013.01); *B23B 2270/06* (2013.01); *B23B 2270/12* (2013.01)

(58) Field of Classification Search
     CPC .......... B23Q 3/002; B23Q 3/005; B23Q 3/06; B23Q 3/102; B23Q 3/103; B23Q 1/0072; B25B 31/107; B25B 31/10; B23B 31/107; B23B 31/10
     USPC .................................................. 269/309, 310
See application file for complete search history.

(56) References Cited

U.S. PATENT DOCUMENTS

| | | | | | |
|---|---|---|---|---|---|
| 6,161,826 | A | * | 12/2000 | Forrer .................... | B23Q 3/183 269/309 |
| 8,413,973 | B2 | * | 4/2013 | Sandmeier ............. | B23Q 16/00 269/289 R |

(Continued)

FOREIGN PATENT DOCUMENTS

| | | | | | |
|---|---|---|---|---|---|
| DE | 29802835 | U1 | * | 8/1998 | ............... B23Q 3/18 |
| EP | 2052808 | A1 | * | 4/2009 | ........... B23Q 1/0072 |

OTHER PUBLICATIONS

See attached DE29802835U1 translation.*

(Continued)

*Primary Examiner* — Tyrone V Hall, Jr.
*Assistant Examiner* — Abbie E Quann
(74) *Attorney, Agent, or Firm* — Maginot, Moore & Beck, LLP

(57) ABSTRACT

A clamping device includes a clamping chuck and a clamping element, which can be clamped thereto. The clamping chuck has a receiving opening for the clamping element and clamping members for clamping the clamping element in the receiving opening. The clamping element is elongated, while the clamping chuck is provided with an elongated receiving opening for the clamping element. A resiliently flexible centering element, which aligns the clamping element in response to the insertion into the receiving opening at right angles to the longitudinal axis of the receiving opening, is arranged on the clamping chuck in the insertion area of the receiving opening. Such a clamping device is suitable in clamping systems by means of which large to very large workpiece carriers can be clamped in the work area of a machine tool in a repeatably accurate manner.

22 Claims, 5 Drawing Sheets

(56) References Cited

U.S. PATENT DOCUMENTS 9,302,359 B2 * 4/2016 Hediger .................. B23Q 3/06
2016/0263716 A1 * 9/2016 Lin ..................... B23Q 1/0072

OTHER PUBLICATIONS

See attached EP2052808A1 translation.*
EP2052808A1 Translation. (Year: 2009).*
Translation (Year: 2009).*

* cited by examiner

CLAMPING DEVICE

PRIORITY CLAIM

This application claims priority to Swiss Application No. 00829/16, entitled "CLAMPING DEVICE", filed in the name of the same inventor and applicant on Jun. 30, 2016, the entire disclosure of which is incorporated herein by reference.

The invention at hand refers to a clamping device, a clamping system comprising a clamping device as well as to a clamping arrangement.

Clamping devices of the type discussed herein serve for the clamping of clamping elements in a clamping chuck at a defined position. Usually, the respective clamping chuck is thereby fixedly assembled on the machine table of a machine tool, while the clamping element or the clamping elements, respectively, are generally arranged on workpiece carriers or pallets.

A generic device for the induced clamping of a workpiece on the workstation of a machine tool is known from EP 0 614 725 A2. The device consists of a support to be fixed to the workstation of the machine tool and of a workpiece carrier able to be placed on the support and able to be clamped thereto. The workpiece carrier has four clamping journals by means of which it can be clamped in four clamping means, which are arranged on the support in a corresponding manner. To position the workpiece carrier on the support, the latter is provided with first alignment members in the form of centering rules, while the workpiece carrier has further alignment members in the form of profiled plates, which are provided with a groove. When fixing the workpiece carrier on the support, the mentioned centering rules engage with the grooves of the profiled plates and position the workpiece carrier in X and Y direction as well as with respect to the angular position about the Z axis. The Z-positioning takes place in that the clamping devices pull the workpiece carrier against the support, until the latter comes to rest with its flat underside on annular support surfaces of the support. Even though such a clamping device has proven itself in practice, it is only conditionally suitable for clamping large to very large workpiece carriers, because as the size of the respective workpiece carrier increases, the absolute length change thereof also increases, for example due to the thermal influences. This is problematic for example because the workpiece carrier is often not made of the same material as the machine table, on which the clamping chucks are arranged. Different heat expansion coefficients thus result between the lower clamping part, namely the machine table comprising the clamping chucks fastened thereto, and the upper clamping part, namely the workpiece carrier comprising clamping elements arranged thereon. Regardless of this, it is also problematic in the case of large workpiece carriers, in the case of which individual clamping elements can in fact be spaced apart from one another by a meter or more, to fasten them to the workpiece carrier so accurately that the distance thereof is matched exactly to the distance between the corresponding clamping chucks. It goes without saying that this is in particular problematic in the case of round clamping elements.

To be able to clamp large workpiece carriers at an exact position, a plurality of clamping chucks are commonly used, wherein the workpiece carrier is provided with a corresponding number of clamping elements. When using a plurality of clamping chucks provided with centering elements, one problem can be that a redundant dimensioning is created in response to clamping the workpiece carrier in the X-Y plane.

To avoid such a redundant dimensioning, a device for the induced clamping of a workpiece is known from EP 0 403 428 A2. This device that least two clamping chucks provided with centering pins and a corresponding number of upper parts, which are provided with centering pins and which can be clamped thereto. The upper parts are arranged on a workpiece fixture. The respective upper part is provided with centering slots, which correspond to the centering pins. Each upper part additionally has a round tensioning pin—tie bolt—, which can be clamped in a central fixture of the respective clamping chuck by means of clamping spheres. While each clamping chuck is provided with four centering pins, only the one upper part is provided with four corresponding centering slots. The other upper part or the other upper parts, respectively, is/are provided with only two centering slots. The position of the workpiece fixture is to thus be determined in X and Y direction by means of the one upper part, while only the angular position about the Z axis is to be determined by means of the other upper part or the other upper parts, respectively.

Even though such a device has proven itself in praxis, the setup thereof is relatively complex and is only conditionally suitable for the repeatable accurate clamping of large and heavy workpiece carriers, in particular because the respective round clamping pin with respect to the central and also round fixture of the respective clamping chuck must be positioned with high accuracy. In addition, very high holding forces cannot be generated with such a device.

A clamping device for clamping a workpiece or tools is known from EP 0 267 352 A2. The device comprises a first coupling part fastened to the machine tool and a second coupling part—carrier—for a workpiece. The two coupling parts are provided with coupling members, which cooperate with one another in pairs. For this purpose, bearing block-like receiving arrangements are arranged on the first coupling part, while the carrier has rigid profile pieces, which engage in grooves of the receiving arrangements for positioning purposes. For clamping the carrier to the first coupling part, provision is made according to an exemplary embodiment for clamp-like protrusions, which engage with an inclined plane of an undercut.

Finally, a clamping device comprising a clamping chuck and a pallet releasably mounted thereon follows from EP 1 595 641 A1. The clamping chuck is provided with four centering grooves, which are offset relative to one another by 90° each, while the pallet has four centering pins, which are arranged so as to correspond thereto. The one flank of the centering groove serves to center the centering pin, while the other flank of the centering groove is formed by a clamping element, by means of which the respective centering pin can be clamped in the groove.

It is the object of the invention to create a clamping device, which belongs to the above-mentioned technical field, which has a simple setup and which, on the one hand, generates high clamping or holding forces, respectively, and, on the other hand, can absorb or compensate, respectively, tolerances with respect to the positioning or arrangement of the corresponding clamping element at least in one direction, namely in X or Y direction, wherein the clamping device is to also be suitable as module for setting up a clamping system.

According to the invention, the clamping device is provided with a clamping chuck and a clamping element, which can be clamped thereto, wherein the clamping chuck has a receiving opening for the clamping element and clamping members for clamping the clamping element, and wherein the clamping element is embodied in an elongated manner and the clamping chuck is provided with an elongated receiving opening for the clamping element, and wherein at least one resiliently flexible centering element, which aligns the clamping element in response to the insertion into the receiving opening at right angles to the longitudinal axis of the receiving opening, is arranged on the clamping chuck in the insertion area of the receiving opening.

In that the clamping device has an elongated receiving opening and a clamping element, which is embodied in an elongated manner, the basic condition is created on the one hand, so that the clamping element can absorb high clamping or holding forces, respectively. This design, together with the resiliently flexible centering element arranged in the insertion area of the receiving opening, makes it possible that, on the other hand, the clamping element does not need to be matched accurately to the receiving opening in longitudinal direction. In addition, such a clamping device has a comparatively simple setup, in particular because the respective clamping element takes over a clamping function as well as a centering function and because separate centering elements can thus be forgone.

In a preferred further development, provision is thus made for the respective centering element to be provided with an elongated centering opening, wherein the receiving opening of the clamping chuck as well as the centering opening are longer than the clamping element. This makes it possible that the clamping element does not need to be inserted exactly in the center in longitudinal direction, i.e. in the direction of the longitudinal axis of the clamping element or of the centering opening, respectively, but can in fact be offset by several millimeters. This design allows for the respective clamping chuck to be able to "compensate" length changes of the workpiece carrier in response to a corresponding arrangement on a clamping support.

In the case of a particularly preferred further development, the clamping members are embodied as elongated slides, which engage with a clamping surface of the clamping element. High clamping and holding forces can thus be transferred to the clamping element.

The clamping chuck is preferably provided with two clamping members, which are arranged in parallel. In contrast to clamping chucks comprising a plurality of clamping elements, such as clamping spheres for example, such clamping members can be produced easily and cost-efficiently and the operation thereof is comparatively easy as well.

A preferred further development provides for the respective clamping member to be longer than the clamping element. It can be ensured by means of this design that the clamping member comes to rest along the entire length of the clamping element, namely even if the clamping element is not introduced centrally, but at a slight offset into the receiving opening of the clamping chuck in longitudinal direction.

A further preferred further development provides for the centering element to be a spring disk, which is formed in one piece, of rust-resistant steel, wherein the spring disk is arranged in the insertion area of the receiving opening of the clamping chuck, and wherein the centering opening is inset in the spring disk. Such a spring disk can be produced easily and cost-efficiently on the one hand and, on the other hand, it can be attached to the clamping chuck quickly and easily.

In the case of a further, preferred further development, it is proposed to provide the clamping element along its two longitudinal sides with a clamping surface each, on which the respective clamping member comes to rest in a positive and/or non-positive manner for retracting and clamping the clamping element. A large clamping surface can be realized in this manner, which can absorb and transfer high forces.

Particularly preferably, the clamping element is provided along its two longitudinal sides with a tapered centering surface each and with a clamping surface each, wherein the clamping surfaces are arranged upstream of the centering surfaces, viewed in insertion direction, and wherein the clamping members are embodied as elongated slides, which are designed to engage with the respective clamping surface of the clamping element. Such a clamping element can be produced easily and allows high clamping forces, wherein it simultaneously also takes over a centering function.

For each clamping member, the clamping chuck preferably has at least one linearly shiftable operating piston, which is received in a piston housing and which is mechanically connected to the respective clamping member. Such a piston provides for a reliable shifting of the assigned clamping member. In addition, it can be realized easily and cost-efficiently.

Particularly preferably, the respective operating piston and/or the respective clamping member is loaded by means of compression springs in the direction of the receiving opening, wherein the respective operating piston can be shifted pneumatically against the force of the springs. Due to this embodiment, the clamping device can automatically lock mechanically and the clamping force is also preserved in the energy-free state. A pneumatic opening of the clamping chuck can also be realized easily.

A preferred further development also provides for the clamping element to be provided on both longitudinal sides with a tapered centering surface each, wherein the respective centering surface is in particular embodied in two steps. Such a centering surface can be realized easily; a two-step centering in the form of a rough and a subsequent fine centering is additionally made possible in the two-step embodiment.

In that the clamping chuck is provided with a continuous receiving opening, which extends across the entire length of the clamping chuck, as it is provided in the case of a preferred further development, the clamping chuck can be cleaned easily, wherein possible dirt particles can escape laterally from the receiving opening. Such an embodiment can additionally be realized easily and cost-efficiently.

In the case of a further, preferred further development of the clamping device, the upper side of the clamping chuck is finally provided with raised support surfaces, which extend on both sides along the receiving opening. This design provides for large-area Z-supports for the workpiece carrier.

It is a further object of the invention to create a clamping system, in the case of which the clamping devices designed according to the invention can be arranged in a particularly advantageous manner.

According to the invention, the clamping system has at least two clamping devices, which have at least two clamping chucks arranged on a clamping support and a corresponding number of clamping elements arranged on a workpiece carrier, wherein at least two clamping chucks are arranged so as to be offset relative to one another by 90°, and clamping elements are arranged on the workpiece carrier so as to correspond thereto. On the one hand, the position of the workpiece carrier in response to clamping in X and Y direction is defined by means of such an arrangement of the clamping chucks, and, on the other hand, the position and arrangement of the clamping elements is relatively uncritical with respect to the clamping chucks.

It is a further object of the invention to create a clamping system, which is suitable in a particularly advantageous manner to be able to also repeatably position and clamp large to very large workpiece carriers with high accuracy, wherein the clamping system is to in particular also be impervious with respect to an accurate positioning of the clamping elements when being attached to the workpiece carrier and/or with respect to production tolerances of the clamping elements and/or with respect to production tolerances of the centering elements and/or of the clamping chucks, and is to for example also react imperviously with respect to temperature-related length changes of the workpiece carrier.

By definition, the clamping system has at least two clamping chucks, which are to be arranged on a clamping support so as to be offset at an angle relative to one another, in particular at least three clamping chucks, which are to be arranged on a clamping support so as to be offset relative to one another at an angle of 60°, 72°, 90° or 120°, and a corresponding number of clamping elements, which are to be arranged on a workpiece carrier in a corresponding manner, wherein the respective clamping chuck has a receiving opening for the clamping element and clamping members for clamping the clamping element in the receiving opening, and wherein the clamping elements as well as the receiving openings of the clamping chucks are embodied in an elongated manner, and at least two clamping chucks in the insertion area of the receiving opening are provided with a resiliently flexible centering element each, which align the respective clamping element at right angles to the longitudinal axis of the receiving opening in response to the insertion into the receiving opening.

In the case of a preferred further development, it is thus proposed for four clamping chucks, which are in each case offset relative to one another by 90°, to be arranged on the clamping support, wherein the workpiece carrier is provided with four clamping elements for clamping the workpiece carrier to the clamping support, and wherein two clamping chucks in the insertion area of the receiving opening are provided with a centering element each for aligning the workpiece carrier in a first direction, and the two other clamping chucks in the insertion area of the receiving opening are provided with a centering element each for aligning the workpiece carrier in a second direction, which runs at right angles to the first direction. Such a clamping system is in particular suitable for the repeatable accurate clamping of medium-sized workpiece carriers.

In the case of a further, preferred further development, it is proposed for at least four clamping chucks to be arranged on the clamping support, wherein at least two clamping chucks are aligned in one direction and wherein at least one further clamping chuck is arranged on the clamping support by 90° relative to the two clamping chucks, which are aligned. Such a clamping system forms the basis for the repeatable accurate clamping of medium-sized to large or very large workpiece carriers.

A further preferred further development provides for at least four clamping chucks to be arranged on the clamping support, wherein at least two clamping chucks are aligned in a first direction and wherein at least two further clamping chucks are aligned in a second direction, and wherein the two clamping chucks, which are aligned in the first direction, are provided with a centering disk each for aligning the respective clamping element in a first direction, and wherein the two clamping chucks, which are aligned in the second direction, are provided with a centering disk each for aligning the clamping element in a second direction, which is offset by 90° relative to the first direction. In the case of such an embodiment, the clamping system zero point runs through the intersection point of two straight lines, which in each case connect the two aligned clamping chucks.

In the case of a further preferred further development, it is proposed for three, four, five or six clamping chucks to be arranged on the clamping support so as to be distributed along a circular line. Such an arrangement is in particular suitable for round workpiece carriers, which in particular serve to receive round workpieces.

Particularly preferably, the receiving opening of the clamping chuck as well as the centering opening inset in the centering element is longer than the respective clamping element. Such a design is in particular impervious with respect to possible length changes of the workpiece carrier with respect to the clamping support.

A further preferred further development of the clamping system provides for each clamping chuck to have two clamping members, which are arranged in parallel and which are embodied as elongated slides, and which are designed to engage with a clamping surface of the respective clamping element. The production of such slides is easy and cost-efficient. In addition, they can transfer high clamping and holding forces to the clamping element.

Further advantageous embodiments and feature combinations of the invention follow from the below detailed description and from the totality of the patent claims.

BRIEF DESCRIPTION OF THE DRAWINGS

The figures of the drawings, which are used to explain an exemplary embodiment, show:

FIG. 1 shows the two essential elements of the clamping device in perspective view. The clamping device comprises a clamping chuck 1 as well as a clamping element 2, which can be clamped in the clamping chuck 1. The clamping chuck 1 is typically fixed to the processing table of a machine tool, while the clamping element 2 is fastened to the underside of a workpiece carrier—pallet. The clamping chuck 1 is illustrated in a view from the top and the clamping element 2, together with the workpiece carrier 40, an outline of which is shown, is illustrated in a view from the bottom. To clamp the clamping element 2 in the receiving opening 7, the clamping chuck 1 is provided with two elongated clamping members, which, however, are not apparent from this illustration.

Figure 1:
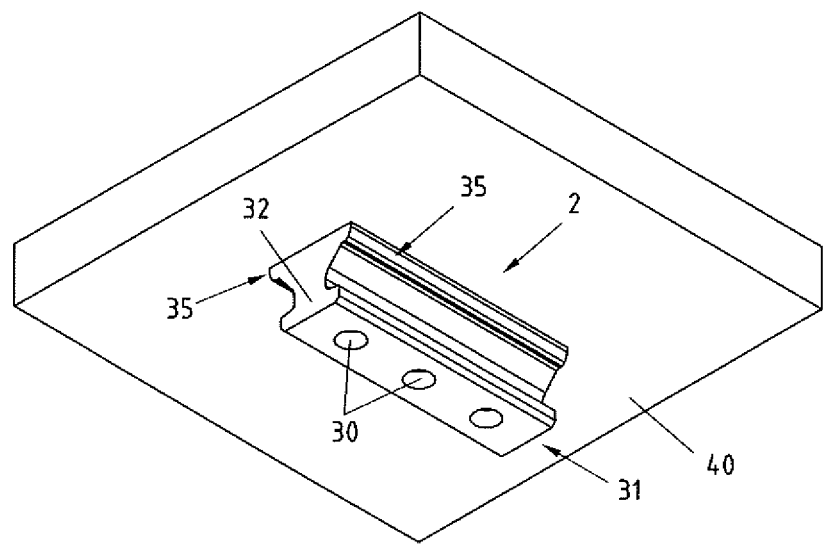
FIG. 1 the clamping device consisting of a clamping chuck and a clamping element, in perspective illustration.
Figure 1:
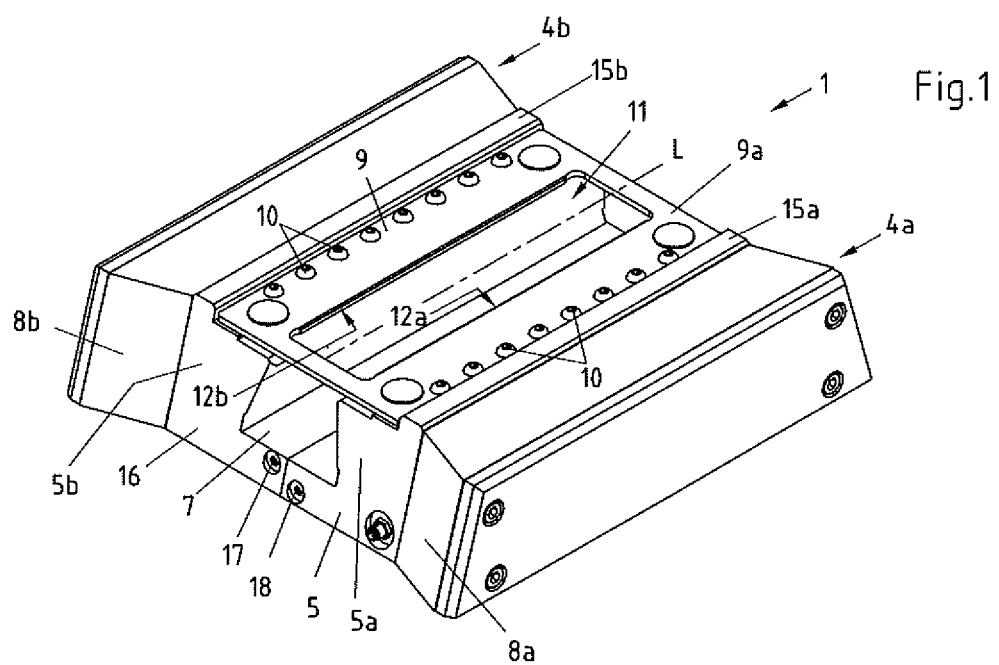

The clamping chuck 1 is formed by two substantially identical clamping chuck halves 4a, 4b. Each clamping chuck half 4a, 4b is provided with a housing 5a, 5b, wherein the two housings 5a, 5b are screwed together in the area of their bottom to form a housing, which is identified with 5 as a whole. Each clamping chuck half 4a, 4b also has a piston housing 8a, 8b, in the interior of which a piston (not visible) is arranged in each case.

The clamping chuck 1 is provided with an elongated, slot-shaped receiving opening 7 for the clamping element 2, which is embodied in an elongated manner. In the insertion area of the receiving opening 7, a centering element 9 in the form of a disk 9a, which is resiliently flexible in Z direction, is arranged on the clamping chuck 1. That direction, which, in the normal case, runs vertically, i.e. perpendicularly to the surface of the processing table, is identified as Z direction, while the X and Y directions run parallel to the surface of the processing table, to which such a clamping chuck 1 is clamped. The centering disk 9a is fastened to the housing 5 or the two housing parts 5a, 5b, respectively, of the clamping chuck 1 by means of screws 10. The centering disk 9 simultaneously acts as reinforcement for the two housing parts 5a, 5b. An elongated centering opening 11, which is embodied in a substantially rectangular manner, is inset in the centering disk 9a. Through this centering opening 11, two side walls 12a, 12b, which run parallel to one another, are formed along the longitudinal side of the centering disk and are matched to the respective clamping element 2 in such a manner that the clamping element 2 is oriented at right angles to the longitudinal axis L of the receiving opening 7 in response to the insertion into the receiving opening 7. These two side walls 12a, 12b form a type of tongues, which are resiliently flexible in Z direction. Depending on the arrangement of the clamping chuck 1, the clamping element 2 is aligned in X or Y direction in response to the insertion into the receiving opening 7. In any case, the clamping element 2 is aligned at right angles to the longitudinal axis L of the receiving opening 7 or of the clamping chuck 1, respectively, in response to the insertion at the two side walls 12a, 12b. For this purpose, the clamping element 2 is provided with tapered side surfaces in the rear or upper area, respectively, as will be explained below. In response to the insertion into the clamping chuck 1, the clamping element 2 comes to rest on the centering disk 9a in a linear manner, which has advantages for example with respect to a dirt resistance, because it acts like a dirt wiper.

On both sides of the centering disk 9a, the clamping chuck 1 is provided with elongated, raised support surfaces 15a, 15b, which form the Z support for the workpiece carrier in response to the clamping to the clamping chuck 1. These support surfaces 15a, 15b run parallel to the longitudinal axis L of the receiving opening 7. In the bottom area, two channels 17, 18, via which compressed air can be introduced, empty into the front side 16 of the clamping chuck 1. The first channel 17 thereby serves to open the clamping chuck, while the other channel 18 is provided for retightening the clamping members. On the one hand, the two channels 17, 18 run through the clamping chuck 1 all the way to the other front side thereof. On the other hand, the respective channel is connected to both clamping chuck halves 4a, 4b. In any case, each chuck half 4a, 4b has a channel for connecting to a compressed air line on each front side. This design simultaneously provides for a series connection of a plurality of clamping chucks.

The clamping element 2 is embodied in the form of an elongated beam, the cross section of which is similar to a railway track. On the one hand, the clamping element 2 can be clamped in the clamping chuck 1; it simultaneously also takes over a centering function in that, in addition to clamping surfaces, it also has centering surfaces, by means of which it is aligned at right angles to the longitudinal axis L of the receiving opening 7 in response to the insertion into the clamping chuck 1. The clamping element 2 has a flat rear side, which comes to rest on the underside of the workpiece carrier 40 in a flat manner in response to being screwed down. The clamping element 2 is provides with holes 30 for receiving fastening screws. On the front side, which is to face the clamping chuck 1, the clamping element 2 is embodied in a T-shaped manner, so that a head part in the form of a protrusion 32 is formed. In the area of the rear side, the clamping element 2 is provided on each longitudinal side with a centering surface 35. The respective centering surface 35 is preferably embodied in a 2-step manner. The workpiece carrier 40 comes to rest on the support surfaces 15a, 15b with its flat underside in response to the clamping of the clamping element 2.

Figure 2:
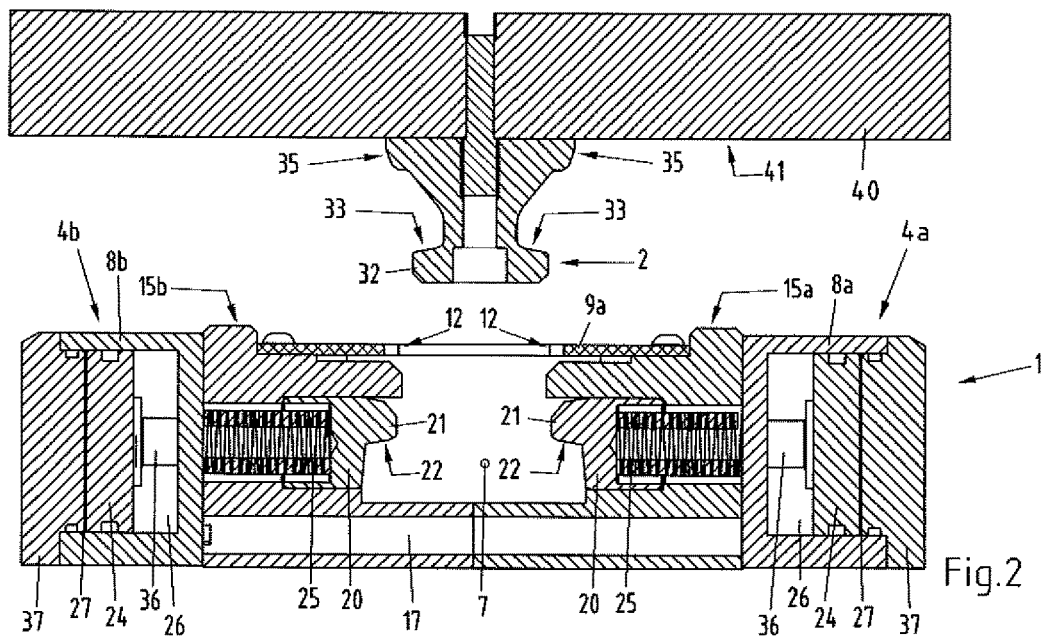
FIG. 2 the clamping device according to FIG. 1 in a section, wherein the clamping element, which is fastened to a workpiece carrier, is illustrated spaced apart from the clamping chuck.
Figure 3:
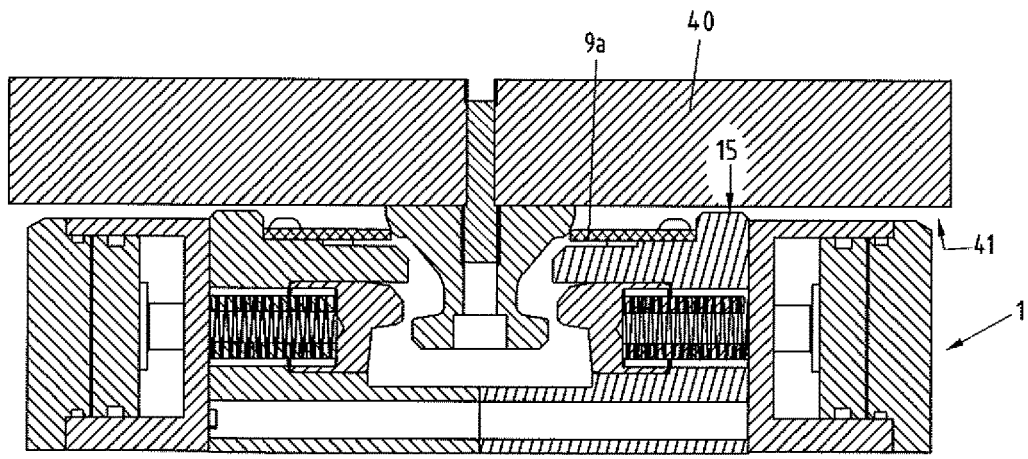
FIG. 3 the clamping device according to FIG. 2, wherein the workpiece carrier is loosely attached to the clamping chuck.
Figure 4:
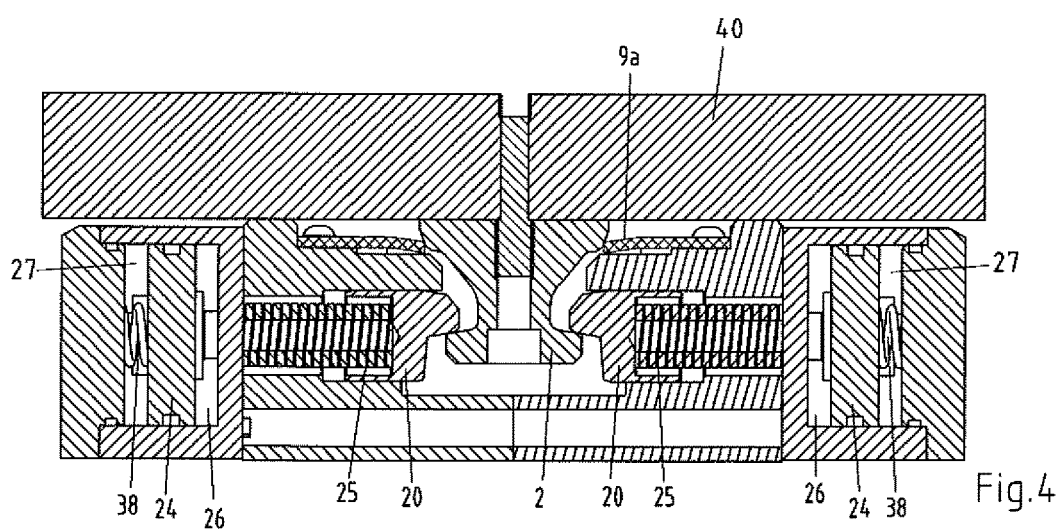
FIG. 4 the clamping device according to FIG. 2 during the clamping of the workpiece carrier to the clamping chuck.

In particular the design of the clamping chuck 1 as well as the operating principle thereof in response to the clamping of the clamping element 2 is explained in more detail by means of FIGS. 2 to 4, which show the clamping chuck 1 together with the clamping element 2, which is fixed to a workpiece carrier 40, in section. The clamping element 2 is fastened to the underside of the schematically illustrated workpiece carrier 40 by means of a plurality of screws.

While FIG. 2 shows the clamping chuck 1 in the open state together with the workpiece carrier 40, which has not been attached or clamped yet, respectively, FIG. 3 shows the clamping chuck 1 in the open state together with the workpiece carrier, which is loosely attached thereto. In FIG. 4, the clamping chuck is illustrated in a snapshot in response to the clamping of the workpiece carrier. Due to the fact that the clamping chuck 1 consists of two clamping chuck halves 4a, 4b, which are embodied substantially identically, and which are illustrated in a mirror-inverted manner herein, the elements of the one clamping chuck half 4a are in each case provided with identical reference numerals as the corresponding elements of the other clamping chuck half 4b.

As can be seen in FIG. 2, two clamping members 20 in the form of slides are arranged in the interior of the clamping chuck 1. The two clamping members 20 are located opposite one another, are embodied in an elongated manner, and are arranged parallel to one another. The clamping members 20 are embodied in one piece and are designed to be highly robust. The two clamping members 20 preferably consist of nitrided steel. Each clamping member 20 is loaded in the direction of the receiving opening 7 by means of a plurality of compression springs 25, wherein only one compression spring 25 is in each case visible for each clamping member 20 from this illustration. The compression springs 25 are supported on the piston housing 8a, 8b on the rear side. The respective clamping member 20 is provided with an appendage 21, the underside of which has a clamping surface 22, by means of which the clamping member 20 can engage with a clamping surface 33 on the rear side of the protrusion 32 of the clamping element 2, in order to retract the clamping element 2 and to clamp it to the clamping chuck 1 together with the workpiece carrier 40. The clamping element 2 is provided with such a clamping surface 33 along both of its longitudinal sides. The two clamping surfaces 33 are in each case formed by an undercut in the clamping element 2. The clamping surface 22 of the respective clamping member 20, which is arranged on the appendage 21, is matched to the clamping surface 33 of the clamping element 2 in such a manner that the clamping element 2 is pulled downwards or into the clamping chuck 1, respectively, with a high force by means of the two clamping members 20. In that the respective clamping member 20 is embodied in the form of an elongated slide, it can come to rest extensively on the clamping element 2 along the entire length thereof and can clamp the workpiece carrier 40 to the clamping chuck 1 with a high force, so that the clamping element 2 and thus also the workpiece carrier 40 can absorb large forces, in particular also large transverse forces. A channel 17 inset into the housing 5 in the bottom area, the function of which will be explained below, can furthermore be seen. Instead of a total of two clamping members, two or three clamping members for example could also be provided per side, so that a total of four or six clamping members would be present, wherein this number should in no way be considered to be conclusive.

The respective clamping member 20 is connected to a piston 24, which is arranged at the same plane, via pressure rods 36. The respective piston 24 is arranged in the interior of the corresponding piston housing 8a, 8b so as to be capable of being laterally shifted. In that the respective piston 24 is arranged horizontally on a plane with the corresponding clamping member 20, the piston 24 can transfer the force directly, i.e. without deflection, to the respective clamping member 20. This design also provides for a compact construction with small installation height of the entire clamping chuck 1. The two pistons 24 move the corresponding clamping members 20 independently from one another, which has the advantage, among others, that the clamping element 2 does not need to be inserted exactly in the center in the clamping chuck in transverse direction. This is advantageous in particular in the case of large clamping systems comprising a plurality of clamping chucks, as will be explained below.

The chamber 26 between the front side of the respective piston 24 and the base area of the piston housing 8a, 8b is identified as pressure chamber, while the chamber 27 between the rear side of the piston 24 and a lateral housing cover 37 is identified as retightening chamber. Overpressure can be applied to the pressure chamber 26 as well as to the retightening chamber 27 via internal channels (not visible). A cable channel 17 can also be seen, which is suitable for receiving sensor lines or the like, for example. The compression springs 25 are embodied and arranged in such a manner that they load the respective piston 24 and thus also the two clamping members 20, in the direction of the receiving opening 7, so that the clamping element 2 is clamped or remains clamped, respectively, in the clamping chuck 2 by means of the force of the springs 25. To bring the respective piston 24 together with the mechanically coupled clamping member 20 into the pushed-back position illustrated herein, the respective pressure chamber 26 must be acted upon pneumatically. For this purpose, a pressure must be generated in the pressure chamber 26, which is so high that the force of the compression springs acting on the respective clamping member 20 as well as of possible further compression springs, together with the frictional resistances, are overcome.

It goes without saying that the two clamping members 20 must be in the pushed-back position, so that the clamping element 2 can be inserted into the clamping chuck 1 and can be clamped therein.

In response to the insertion of the clamping element 2 into the receiving opening 7 of the clamping chuck 1, the clamping element front part is first inserted into the receiving opening 7 with its two clamping surfaces 33. At the end of the insertion process, the centering surfaces 35 of the clamping element 2 then come to rest on the centering disk 9a. In any case, the clamping surfaces 33 of the clamping element 2 are arranged upstream of the centering surfaces 35, viewed in insertion direction.

FIG. 3 shows the clamping chuck 1 together with the workpiece carrier 40 resting loosely thereon. In this context, loosely means that the workpiece carrier 40 bears on the clamping chuck 1 only with its dead weight, obviously including possible workpieces fastened thereto. When placing the workpiece carrier 40 onto the clamping chuck 1, the centering surfaces 35 of the clamping element 2 come to rest on the centering disk 9a (FIG. 2) and thereby align the clamping element 2 at right angles to the longitudinal axis of the receiving opening 7. In any case, the centering surfaces of the clamping element 2 are dimensioned and matched to the centering disk in such a manner that the clamping element is aligned exactly at right angles to its longitudinal axis L (FIG. 5) or at right angles to the longitudinal axis of the receiving opening, respectively, in response to the insertion into the centering opening or the receiving opening, respectively. Due to the two-step design of the centering surfaces, which are arranged on the clamping element, a coarse alignment is carried out first, and then a fine centering.

As illustrated in FIG. 3, a small gap can remain in the case of light workpiece carriers 40 after the loose placement between the flat underside 41 of the workpiece carrier and the surface of the support surfaces 15, because the respective clamping element 2 is supported on the centering disk 9a in Z direction. It goes without saying that it in particular depends on the geometry of the centering surfaces of the clamping element with respect to the centering opening of the centering disk as well as on the stiffness of the centering disk and the total weight of the workpiece carrier, whether such a gap exists after the loose placement. The centering disk preferably has a thickness of between 2 and 5 millimeters, so that certain transverse forces can also be absorbed via the centering disk 9a.

Provided that after the loose placement of the workpiece carrier, a gap remains between the underside 41 thereof and the support surfaces 15, the positioning of the workpiece carrier in Z direction takes place by using the resilient flexibility of the centering disk. This gap is eliminated when the clamping element is pulled further into the clamping chuck under the effect of the clamping members. The position of the clamping element at right angles to the longitudinal axis of the receiving opening does not change any longer thereby, because only a very small movement of the workpiece carrier or of the clamping element, respectively, in Z direction occurs after the loose placement of the workpiece carrier. After the alignment of the clamping element 2, the workpiece carrier 40 typically only moves in Z direction by a few tenth of a millimeter, until it comes to rest on the raised surface sections 15 of the clamping chuck 1. The basic principle of such a positioning is known from EP 0 111 092 B2.

FIG. 4 shows a section through the clamping chuck 1, together with the workpiece carrier 40 and the clamping element 2 fastened thereto during the clamping of the workpiece carrier 40. Overload springs 38, which are clamped between the rear side of the respective piston 24 and the lateral housing cover 37, can also be seen from this illustration. Even though only one overload spring 38 can be seen per piston 24, a plurality of such springs 38 is present for each piston 24. These overload springs 38 load the piston 24 in the direction of the inner clamping chuck side and increase the clamping force of the clamping member 20, which is connected to the respective piston in a non-positive manner, in addition to the compression springs 25 as already mentioned above. The mechanical clamping force can be increased effectively by means of such overload springs 38. It goes without saying that the force of these overload springs 38 must also be overcome in response to the pneumatic push-back of the respective piston 24.

So that the two clamping members 20 can shift inwards into the effective or clamped position, respectively, the pressure is reduced in the pressure chamber 26 or the pressure chamber 26 is opened towards the atmosphere, respectively, The two pistons 24, together with the clamping members 20, which are connected thereto in a non-positive manner, then move inwards under the force of the compression springs 25, 38. The clamping surface 22 of the respective clamping member 20 then comes to rest on the corresponding clamping surface 33 of the clamping element 2 (FIG. 2) and pulls it downwards in Z direction, together with the workpiece carrier 40, until the workpiece carrier 40 comes to rest on the raised surface sections of the clamping chuck 1. In response to this Z-positioning, the centering disk 9a is elastically deformed in the direction of the inner clamping chuck side in the area of the centering opening, as can be seen in outlines. Such a clamping device locks automatically under the force of the springs 25, 38. In addition, the clamping force is also preserved in the energy-free state. To increase the clamping or retraction force, respectively, if necessary, a pressure can be applied pneumatically to the retightening chamber 27.

Figure 5:
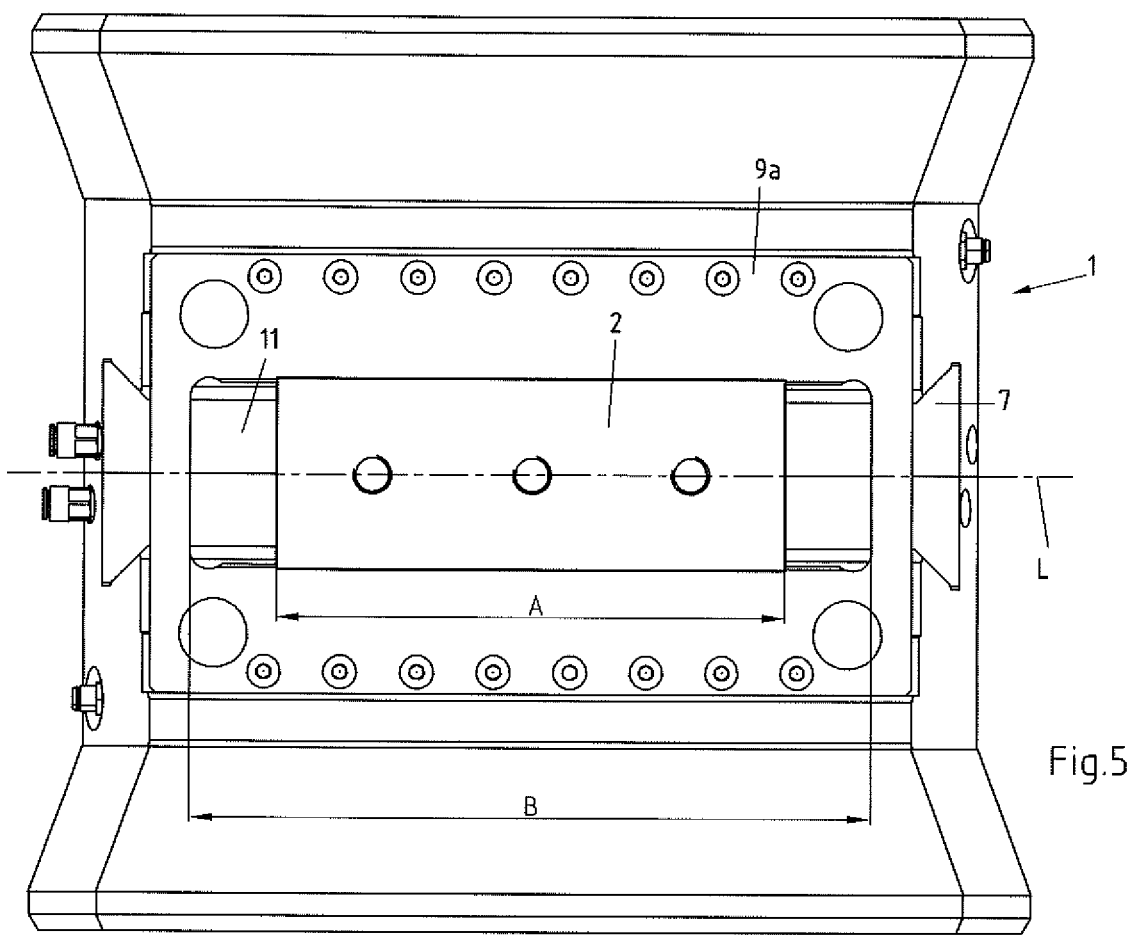
FIG. 5 the clamping chuck together with the clamping element, which is received in the receiving opening.
Figure 6:
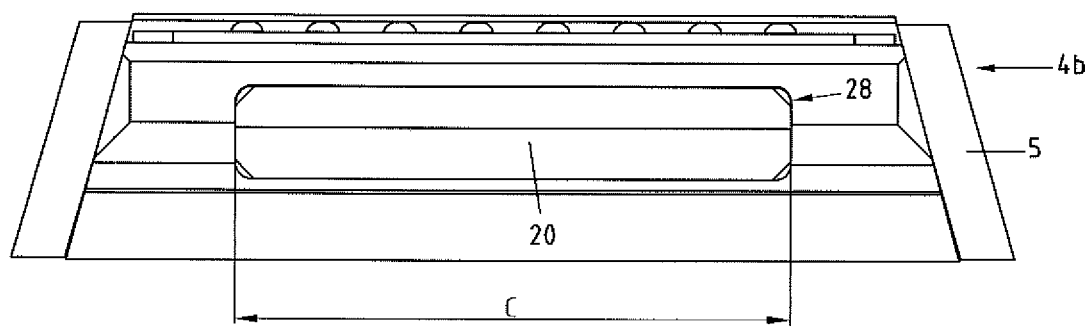
FIG. 6 the one clamping chuck half in a view from the inner side, together with the workpiece carrier and the clamping element arranged thereon.

FIG. 5 shows the clamping chuck 1 together with a clamping element 2, which is received in the receiving opening 7, in a view from the top. It can be seen in this illustration that the centering opening 11, which is inset in the centering disk 9a, is significantly longer than the clamping element 2. The length of the clamping element 2 is identified with A, while the length of the centering opening 11 is identified with B. It can furthermore be seen that the receiving opening 7 extends through the entire clamping chuck 1 in longitudinal direction and is thus obviously also longer than the clamping element 2. Preferably, the centering opening 11 as well as the receiving opening 7 is longer than the clamping element 2 by at least 5%, particularly preferably by at least 10%, especially preferably by at least 20%. Such a design ensures that the clamping element 2 does not need to be inserted into the clamping chuck 1 centrally or exactly in the middle, respectively, but that said clamping element can in fact be inserted into the centering opening 11 or receiving opening 7, respectively, of the clamping chuck 1 so as to be shifted by several millimeters or even by several centimeters in longitudinal direction, i.e. in the direction of the longitudinal axis L of the clamping element 2 or of the centering opening 11, respectively, which is advantageous in particular in the case of large workpiece carriers or clamping systems, respectively, as will be explained in more detail below. In a simplified illustration, FIG. 6 shows the one clamping chuck half 4b in a view from the inner side. In addition, the workpiece carrier 40 together with the clamping element 2, which is arranged thereon and which is also illustrated in a simplified manner, can be seen. In particular the clamping member 20, which is received in a slide opening 28 of the clamping chuck housing 5, can be seen in this view. The length of the clamping element 2 is identified with A, in turn, while the length of the clamping member 20 is identified with C. The clamping member 20 is preferably slightly longer than the clamping element 2. It can be ensured through this that, along the entire clamping element 20, the clamping member 20 comes to rest on the clamping surface thereof, which is important insofar as the respective clamping element 20 is in fact not always inserted centrally into the clamping chuck 1 in longitudinal direction, which can in particular be caused by the fact that different workpiece carriers 40 can be clamped by means of such clamping chucks.

The clamping device illustrated in FIGS. 1 to 6 forms the basic element for forming a clamping system, by means of which in particular large and/or heavy workpieces or workpiece carriers, respectively, can be clamped in the work area of a machine tool, for example a milling machine, grinding machine, eroding machine or a lathe. The term large or very large workpiece carriers, respectively, is understood to be workpiece carriers, which can have a width or length, respectively, of approx. one meter and more in at least one direction, wherein they can in fact also have a size of up to ten meters. Workpieces with a total weight of up several thousands of kilograms can be fastened to such workpiece carriers. In any case, such a clamping device forms a modular component, by means of which large to very large clamping systems can be realized.

Figure 7:
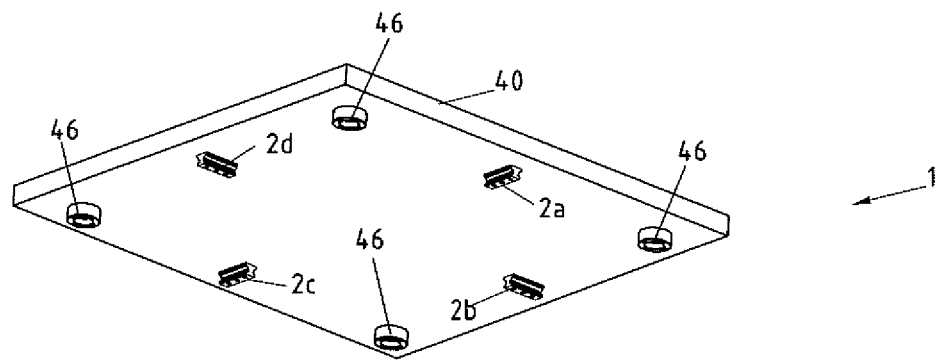
FIG. 7 a perspective view of a clamping system comprising a clamping support and an upper clamping part.
Figure 7:
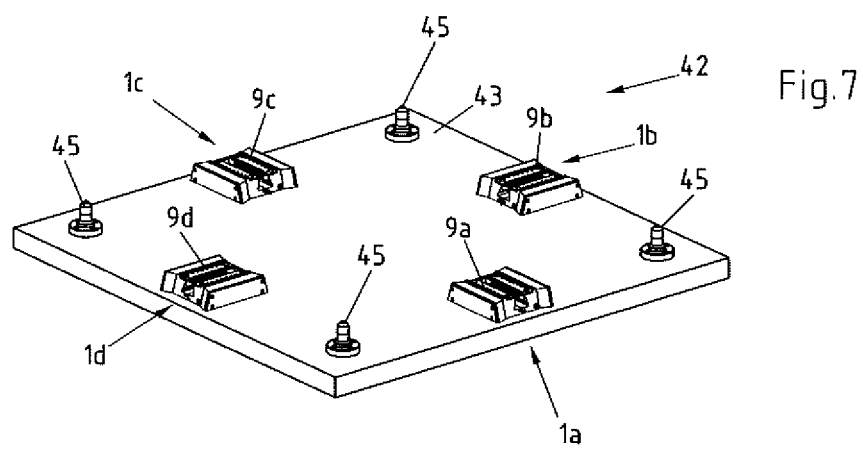

FIG. 7 shows such a clamping system, which has a clamping support 42 and an upper clamping part. The clamping support 42 comprises four clamping chucks 1a-1d, while the upper clamping part comprises a workpiece carrier 40 comprising four clamping elements 2a-2d arranged thereon. The respective clamping chuck is arranged on a schematically suggested machine table 43 of a machine tool (not visible) so as to be offset by 90° with respect to its two adjacent clamping chucks, while the four clamping elements 2a-2d are arranged on the underside of the workpiece carrier 40 so as to correspond to the clamping chucks 1a-1d. In the example at hand, the clamping system additionally comprises four pre-centering devices consisting of four centering pins 45 arranged on the machine table 43, and of four centering sleeves 46 arranged on the workpiece carrier 40. The pre-centering devices serve the purpose that the clamping elements 2a-2d of the workpiece carrier 40 can be aligned comparatively easily and quickly to the four clamping chucks 1a-1d when being guided towards the clamping support 42. It can thus be prevented that the clamping elements 2a-2d damage the clamping chucks 1a-1d, namely if they are not aligned sufficiently accurately to the respective clamping chuck 1a-1d during the lowering of the workpiece carrier 40. It must be considered hereby that the workpiece carrier 40, which can in fact have a weight of several hundreds to several thousands of kilograms, is usually moved by means of a crane or the like and is attached to the clamping support 42. The workpiece carrier 40 alone typically has a weight of at least approx. 200-300 kilograms and can receive a weight of up to several thousands of kilograms. In the case of insufficient alignment of the workpiece carrier 40 with respect to the clamping support 42, the centering pins 45 come to rest on the underside of the workpiece carrier 40 and prevent the further lowering thereof and thus possible damages to the clamping chucks 1a-1d.

In the example according to FIG. 7, all four clamping chucks 1a-1d are provided with a centering disk 9a-9d and all four clamping elements 2a-2d are provided with centering surfaces for alignment on the respective centering disk 9a-9d. Even though this generally provides for a mechanical correspondence in the X-Y plane, this can be compensated for the most part by the resilient flexibility of the centering disks. Such a design is in particular suitable for small to medium-sized clamping systems.

Figure 8:
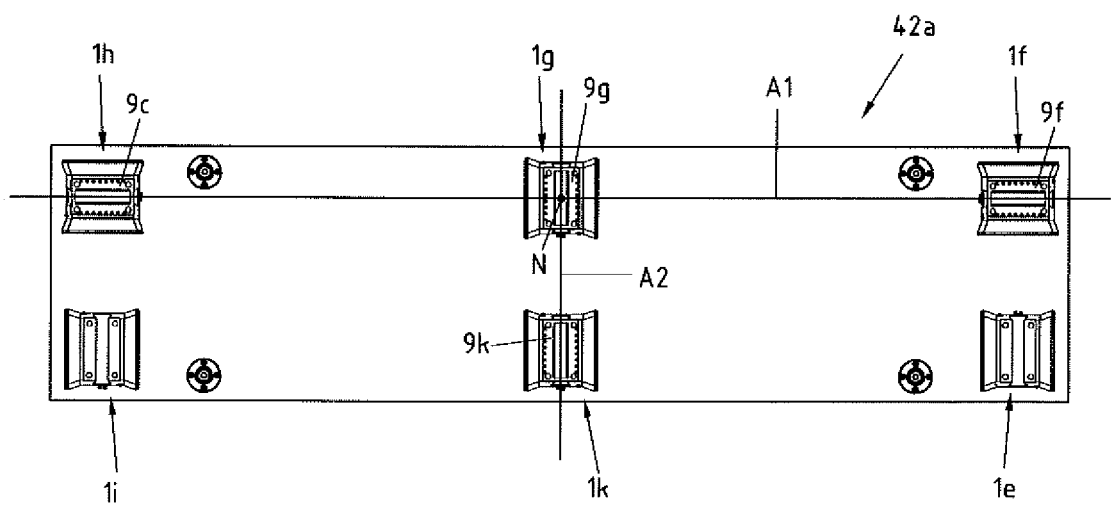
FIG. 8 a clamping support, which is suitable for clamping large to very large workpiece carriers.

FIG. 8 shows an exemplary embodiment of a clamping support 42*a*, which is suitable for large to very large clamping systems. For this purpose, the clamping support 42*a* is provided with a total of six clamping chucks 1*e*-1*k*. Of the six clamping chucks 1*e*-1*k*, the two middle clamping chucks 1*g*, 1*k* are aligned on the one hand. On the other hand, the two upper outer clamping chucks 1*f*, 1*h* are also aligned. The two lower outer clamping chucks 1*e*, 1*i* are not aligned with any of the other clamping chucks 1*f*, 1*g*, 1*h*, 1*k*.

When referring to being aligned, this is to be understood in such a manner in the context at hand that the longitudinal central axes of the respective clamping chucks 1*g*, 1*k*; 1*f*, 1*h* are located on a line—axis—A2 or A1, respectively.

Not all clamping chucks are provided with a centering disk in this example, but only the two middle ones 1*g*, 1*k*, which define the Y direction, and the two outer rear ones 1*f*, 1*h*, which define the X direction, include centering disks 9*g*, 9*k*, 9*f* and 9*c*, respectively. The two outer lower clamping chucks 1*e*, 1*i* do not have a centering disk; they thus only serve to clamp a clamping element, which is arranged on the pallet in a corresponding manner. The point of intersection of the axes A1, A2, which run through the clamping chucks 1*f*, 1*h*; 1*g*, 1*k*, which are provided with a centering disk, thereby forms the clamping system zero point N.

It goes without saying that at least individual ones of the clamping chucks are arranged as far away from one another as possible, so that the clamping elements, which are attached to the respective workpiece carrier in a corresponding manner, can also be arranged as far as possible on the outside of the workpiece carrier.

By omitting the centering disks in the two outer lower clamping chucks 1*e*, 1*f*, a mechanical correspondence is to be avoided on the one hand. On the other hand, it is to be made possible that large to very large workpiece carriers can be clamped therewith, in particular because, as mentioned above, the absolute length of the respective workpiece carrier can also vary with the size thereof, for example due to thermal influences. Due to the design and arrangement of the clamping devices according to the invention, such length changes with respect to a repeatable accurate clamping of the workpiece carrier do not have a noteworthy negative effect. Due to the fact that the two clamping members 20 of a clamping chuck are moved independently from one another by means of the respective piston, the respective clamping element does not need to be inserted into the respective clamping chuck exactly in the center. This advantage in particular takes effect in the case of the two clamping chucks 1*e*, 1*i*, which do not have a centering disk. Length changes of the workpiece carrier, which mainly result from thermal expansions, can thus be compensated.

Such a clamping support 42*a* is also suitable for clamping workpiece carriers comprising four clamping elements. Workpiece carriers, the clamping elements of which cooperate with the two middle clamping chucks 1*g*, 1*k* and either with the right 1*e*, 1*f* or the left h, 1*i* clamping chucks, can be used thereby.

On the one hand, a clamping system designed in this manner is relatively impervious with respect to an accurate positioning of the clamping elements on the workpiece carrier, as well as with respect to production tolerances of the clamping elements and of the centering elements, because certain inaccuracies can be compensated by the spring disks on the one hand, and because the described arrangement of the clamping chucks also contributes to the fact that for example temperature-related length changes of the workpiece carrier can be compensated or absorbed, respectively, on the other hand.

As an alternative to the exemplary embodiment according to FIG. 8, all clamping chucks could also be provided with centering disks. In this case, the centering surfaces 35 could preferably be omitted in the case of some clamping elements, so that the corresponding clamping elements do not come to rest on the centering disks in response to the clamping to the clamping chuck, but serve only for the clamping in the clamping chuck. It goes without saying that a combination of both is also possible, in that the centering disks are omitted in the case of one or a plurality of clamping chucks, and in that the centering surfaces are omitted in the case of one or a plurality of clamping elements.

Preferably, the respective clamping support 42, 42*a* is additionally also provided with elements for detecting the presence of a workpiece carrier. Depending on design, arrangement and operating principle, a correct clamping of the workpiece carrier can also be detected via such elements. For example, commercial proximity switches can be used as elements, for example on mechanical, inductive, capacitive, optical or magnetic basis.

Figure 9:
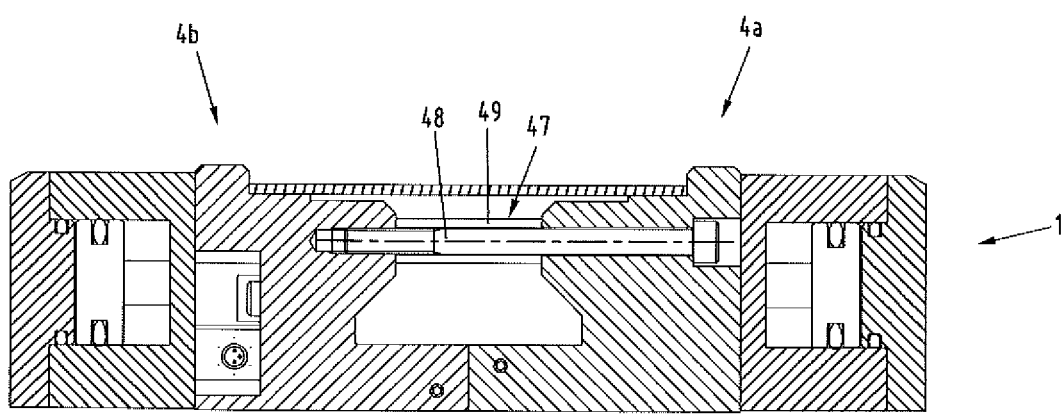
FIG. 9 an alternative exemplary embodiment of a clamping chuck in a section.

FIG. 9 shows an alternative and particularly preferred exemplary embodiment of the clamping chuck 1 in a section. To embody the clamping chuck 1 in a more stable and stiffer manner as a whole, the two clamping chuck halves 4*a*, 4*b* are connected to one another in the upper area by means of two struts 47, wherein only the one of the two struts can be seen from this illustration. Each strut consists of a distance sleeve 48 and of a clamping screw 49. The clamping chuck 1 is reinforced in both end areas by means of such a strut 47 each. The clearance between the two struts is thereby larger than the length of a clamping element. Preferably, the clearance between the two struts is approximately identical to the length of the centering opening 11 inset into the centering disk 9*a* (FIG. 1), so that the above-specified advantages, namely that the clamping element does not need to be inserted exactly in the middle in longitudinal direction, i.e. in the direction of the longitudinal axis of the clamping element or of the centering opening, respectively, but can in fact be offset by several millimeters, is preserved. The two struts are also embodied and attached in such a manner that the identical design of the two clamping chuck halves 4*a*, 4*b* is preserved.

It goes without saying that the above exemplary embodiments are not to be considered to be conclusive or comprehensive. Clamping systems, which are provided with a plurality of clamping chucks arranged so as to be distributed on a circular line, could thus also be realized in the context of the invention. For example, three, four, five or six clamping chucks could be arranged on a clamping support so as to be distributed along a circular line.

The advantages of clamping devices or clamping systems, respectively, which are designed according to the invention, can be summarized as follows:

Very high clamping and holding forces can be generated;

The individual clamping chuck can absorb very high transverse forces;

The clamping chucks, together with the clamping elements, are suitable as modules for setting up clamping systems of different sizes and different designs;

Very large clamping systems for very large and heavy workpiece carriers can be realized by means of the modules;

Very large workpiece carriers can also be clamped to the clamping support with a repeat accuracy in the range of approx. 10 to 20 micrometers;

The clamping elements can be attached easily and quickly to workpiece carriers in a large variety of designs;

A possible overdeterminacy can be avoided or compensated, respectively, for the most part by means of resiliently flexible centering disks;

The clamping chucks have a large installation height;

The clamping chucks have a simple setup, can be used reliably and can be produced inexpensively;

A clamping chuck consist of two halves of identical construction;

The respective clamping element is mechanically locked in the clamping chuck by means of compression springs;

The compression springs ensure that the clamping force is also preserved in the energy-free state;

A pneumatic series connection of the clamping chuck is possible;

The clamping chucks have a dirt-tolerant design;

The clamping chucks can be cleaned easily;

The clamping system is impervious with respect to an accurate positioning of the clamping elements when being attached to the workpiece carrier;

The clamping system is impervious with respect to production tolerances of the clamping elements;

The clamping system is impervious with respect to production tolerances of the centering elements;

The clamping system reacts imperviously with respect to temperature-related length changes of the workpiece carrier.

What is claimed is:

1. A clamping device comprising a clamping chuck and a clamping element, which can be clamped thereto, wherein the clamping chuck has an elongated slot-shaped receiving opening, defining a longitudinal axis, for the clamping element and clamping members for clamping the clamping element in the receiving opening, characterized in that the clamping element is embodied in an elongated manner to be received through an elongated insertion area of the elongated receiving opening, and that at least one resiliently flexible centering element is configured and operable to align the clamping element in response to an insertion into the receiving opening at right angles to the longitudinal axis of the receiving opening, wherein the centering element is arranged on the clamping chuck in the insertion area of the receiving opening.

2. The clamping device according to claim 1, characterized in that the clamping element has a length and the at least one centering element is provided with an elongated centering opening, wherein the receiving opening of the clamping chuck and the centering opening each have a respective length that is longer than the length of the clamping element.

3. The clamping device according to claim 2, characterized in that the at least one centering element is a centering disk, which is formed in one piece, of rust-resistant steel, wherein the centering disk is arranged in the insertion area of the receiving opening of the clamping chuck, and wherein the centering opening is inset in the centering disk.

4. The clamping device according to claim 1, characterized in that the clamping members are embodied as elongated slides, which are designed to engage with a clamping surface of the clamping element.

5. The clamping device according to claim 1, characterized in that the clamping chuck is provided with two clamping members, which are arranged in parallel.

6. The clamping device according to claim 4, characterized in that each of the clamping members each have a respective length that is longer than the length of the clamping element.

7. The clamping device according to claim 1, characterized in that the clamping element comprises two longitudinal sides with respective clamping surfaces, on which the respective clamping member comes to rest in a positive or non-positive manner for retracting and clamping the clamping element.

8. The clamping device according to claim 1, characterized in that the clamping element comprises two longitudinal sides with respective tapered centering surfaces and respective clamping surfaces, wherein the clamping surfaces are arranged upstream of the centering surfaces, viewed in an insertion direction, and wherein the clamping members are embodied as elongated slides, which are designed to engage with the respective clamping surfaces of the clamping element.

9. The clamping device according to claim 1, characterized in that for each of the clamping members, the clamping chuck has at least one linearly shiftable operating piston, which is received in a piston housing and which is mechanically connected to the respective clamping member.

10. The clamping device according to claim 9, characterized in that one or both of the respective operating piston and the respective clamping member is loaded by means of compression springs in a direction of the receiving opening, and that the respective operating piston can be shifted pneumatically against a force of the springs.

11. The clamping device according to claim 1, characterized in that the clamping element comprises two longitudinal sides with respective tapered centering surfaces.

12. The clamping device according to claim 1, characterized in that the receiving opening extends continuously across an entire length of the clamping chuck.

13. The clamping device according to claim 1, characterized in that an upper side of the clamping chuck is provided with raised support surfaces, which extend on both sides along the receiving opening.

14. A clamping system comprising at least two of the clamping devices embodied according to claim 1, which have at least two of the clamping chucks arranged on a clamping support and a corresponding number of the clamping elements arranged on a workpiece carrier, characterized in that the at least two of the clamping chucks are arranged so as to be offset relative to one another at an angle of in particular 60°, 72°, 90° or 120°, and the clamping elements are arranged on the workpiece carrier so as to correspond to the at least two of the clamping chucks.

15. A clamping system comprising at least three clamping chucks, which are arranged offset relative to one another at an angle of 60°, 72°, 90° or 120°, and a corresponding number of clamping elements, which are to be arranged on a workpiece carrier corresponding to the at least three clamping chucks, wherein each clamping chuck has a receiving opening for a corresponding one of the clamping elements and clamping members for clamping the corresponding one of the clamping elements in the receiving opening, characterized in that the clamping elements are elongated and the receiving openings of the clamping chucks are embodied in an elongated slot-shaped manner, and the at least three clamping chucks define an elongated insertion area of the receiving opening, the insertion area provided with a resiliently flexible centering element which is configured to align the corresponding one of the clamping elements at right angles to a longitudinal axis of the receiving opening in response to an insertion of the corresponding one of the clamping elements into the receiving opening.

16. The clamping system according to claim 15, wherein the at least three clamping chucks includes at least four clamping chucks offset relative to one another by 90° on the clamping support, and wherein the corresponding number of clamping elements includes at least four clamping elements for clamping the workpiece carrier to the clamping support arranged on the workpiece carrier, characterized in that two of the at least four clamping chucks define an insertion area of the receiving opening that is provided with a centering disk for aligning the workpiece carrier in a first direction, and at least two other of the four clamping chucks define an insertion area of the receiving opening that is provided with a centering disk for aligning the workpiece carrier in a second direction, wherein the second direction runs at right angles to the first direction.

17. The clamping system according to claim 15, characterized in that the at least three clamping chucks includes at least four clamping chucks arranged on the clamping support, wherein at least two of the at least four clamping chucks are aligned in one direction and at least one further clamping chuck of the at least four clamping chucks is arranged on the clamping support at 90° relative to the at least two of the four clamping chucks.

18. The clamping system according to claim 15, characterized in that at least four clamping chucks are arranged on the clamping support, wherein at least two of the at least four clamping chucks are aligned in a first direction and wherein at least two further clamping chucks of the at least four clamping chucks are aligned in a second direction, and wherein the at least two of the at least four clamping chucks, which are aligned in the first direction, are each provided with a centering disk each for aligning the respective clamping elements in a first direction, and wherein the at least two other of the at least four clamping chucks, which are aligned in the second direction, are each provided with a centering disk for aligning the respective clamping elements in a second direction, which is offset by 90° relative to the first direction.

19. The clamping system according to claim 15, characterized in that three, four, five or six clamping chucks of the at least three clamping chucks are arranged on the clamping support so as to be distributed along a circular line.

20. The clamping system according to claim 15, characterized in that the receiving opening of each of the at least three clamping chucks and a centering opening inset in the centering element provided in the receiving opening have a length that is longer than the length of the respective clamping elements.

21. The clamping system according to claim 15, characterized in that each of the at least three clamping chucks has two clamping members, which are arranged in parallel and which are embodied as elongated slides, and which are designed to engage with a clamping surface of the respective clamping element.

22. A clamping arrangement comprising a clamping support and a workpiece carrier, wherein the clamping support has at least four clamping chucks and the workpiece carrier comprises a number of clamping elements corresponding to the at least four clamping chucks, by means of which the workpiece carrier can be repeatedly clamped to the clamping support at an exact position, characterized in that the each of the number of clamping elements is embodied in an elongated manner to be received through an elongated insertion area of an elongated slot-shaped receiving opening defined in each of the at least four clamping chucks for receiving a corresponding one of the number of clamping elements, wherein at least two of the at least four clamping chucks are provided with a resiliently flexible centering disk in the insertion area of the receiving opening, wherein the centering disk defines an elongated centering opening for the respective clamping element, in order to align the respective clamping element in one direction in response to an insertion into the receiving opening, and wherein the receiving opening of the clamping chuck as well as the centering opening have a length that is longer than a length of the clamping element.

* * * * *